(12) United States Patent
Rumberg et al.

(10) Patent No.: US 11,906,382 B2
(45) Date of Patent: Feb. 20, 2024

(54) METHOD AND DEVICE FOR DETERMINING THE AMOUNT OF A GAS PRESENT IN A BATTERY CELL

(71) Applicant: VOLKSWAGEN AKTIENGESELLSCHAFT, Wolfsburg (DE)

(72) Inventors: Björn Rumberg, Wolfenbüttel (DE); Bernd Epding, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 129 days.

(21) Appl. No.: 17/374,336

(22) Filed: Jul. 13, 2021

(65) Prior Publication Data

US 2022/0011185 A1    Jan. 13, 2022

(30) Foreign Application Priority Data

Jul. 13, 2020  (DE) .................. 10 2020 118 436.0

(51) Int. Cl.
*G01L 7/18*   (2006.01)
*G01N 9/18*   (2006.01)
*H01M 10/48*   (2006.01)

(52) U.S. Cl.
CPC .............. *G01L 7/182* (2013.01); *G01N 9/18* (2013.01); *H01M 10/48* (2013.01)

(58) Field of Classification Search
CPC ........... G01L 7/182; G01N 9/18; H01M 10/48
See application file for complete search history.

(56) References Cited

U.S. PATENT DOCUMENTS

| 2005/0118512 A1* | 6/2005 | Onuki .............. H01M 10/0567 429/336 |
| 2019/0178944 A1* | 6/2019 | Rango ............... H01M 10/617 |
| 2019/0280333 A1 | 9/2019 | Dahn et al. |

FOREIGN PATENT DOCUMENTS

| CN | 2 11 262 376 U | 8/2020 |
| DE | 10 2013 016 789 A1 | 7/2014 |

OTHER PUBLICATIONS

Ben Rowden, "A review of gas evolution in lithium ion batteries" (Year: 2020).*
Thermophysical properties: Ethanol (Year: 2010).*
(Continued)

*Primary Examiner* — Natalie Huls
*Assistant Examiner* — Sharad Timilsina
(74) *Attorney, Agent, or Firm* — PEARL COHEN ZEDEK LATZER BARATZ LLP

(57) ABSTRACT

A method for determining the amount of a gas present in a battery cell, whereby the battery cell has an initial volume, comprises at least the following steps: a) immersing the battery cell into a non-conductive liquid having a defined density at a first ambient pressure; b) generating a lifting force that acts in the opposite direction of a downforce of the battery cell; c) changing the first ambient pressure to a second ambient pressure, and measuring the buoyancy force—which is dependent on the ambient pressure—of the battery cell in the liquid; and d) measuring the amount of gas present in the battery cell, taking into account the first and second ambient pressures, the buoyancy forces ascertained for these ambient pressures, the temperature of the non-conductive liquid and the density of the liquid.

11 Claims, 2 Drawing Sheets

(56) References Cited

OTHER PUBLICATIONS

Rowden et al., A review of gas evolution in lithium ion batteries, Energy Reports, vol. 6, Supplement 5, 2020, pp. 10-18.
Search report for German Patent Application No. 10 2020 118 436.0, dated May 26, 2021.

* cited by examiner

METHOD AND DEVICE FOR DETERMINING THE AMOUNT OF A GAS PRESENT IN A BATTERY CELL

CROSS REFERENCE TO RELATED APPLICATIONS

This application claims priority to German Patent Application No. 10 2020 118 436.0, filed Jul. 13, 2020, which is incorporated by reference in its entirety.

FIELD OF THE INVENTION

The present invention relates to a method and to a device for determining the amount of a gas present in a battery cell.

BACKGROUND OF THE INVENTION

Battery cells of the type used, for example, in the traction batteries of electric motor vehicles usually have a plurality of so-called pouch cells. In this context, the pouch cells are structured in such a way that a sturdy pouch foil is employed in order to permanently and tightly enclose the cell stack arranged therein. For this purpose, the cell stack has, for instance, anode layers, cathode layers and separator layers, an electrolyte and arrester lugs in order to conduct the generated currents via arrester tabs to the contacts that are situated on the outside of the pouch cells.

In order to ascertain the long-term durability of lithium-ion pouch cells, it is necessary to determine the formation of gas and the associated pressure rise in the pouch cells. The information thus acquired can be used to create physical and empirical models and to supply them with data that allows a prediction of the formation of gas under various utilization scenarios.

Towards this end, it is a known procedure, for example, to employ the volume change of the pouch cells that is manifested by a bulging of the pouch cells or so-called gas pockets in order to measure gas formation. For this purpose, it is a known approach to employ the Archimedes principle as described, for example, in U.S. Pat. Appln. No. 2019/0280333 A1. The drawback of this method lies in the fact that, as soon as a pouch cell is completely filled with gas, it is only the pressure that still rises inside the pouch cell, but the volume no longer changes. Therefore, this method only allows the initial gas formation to be measured.

It is likewise a known procedure to determine the amount of gas present in a pouch cell by opening the pouch cell in a vacuum having a defined volume in order to subsequently derive the volume of the amount of gas from the measured rise in pressure. With this second method for determining the amount of gas present in the pouch cell, the pouch cell that is to be examined has to be destroyed in order to carry out the measurement. Consequently, it is not possible to observe the formation of gas in a pouch cell over a prolonged period of time. Instead, a very large number of pouch cells has to be tested if a model is to be created for the formation of gas under various states of charge and temperatures. Moreover, this method entails the disadvantage that the determined amount of gas is significantly influenced by the degree of solubility of the gas in the specific electrolyte that is being used. The solubility of the gas in the electrolyte, in turn, is highly dependent on the pressure that prevails in the battery cell or pouch cell as well as on the temperature, so that the amount of gas that is to be determined is likewise highly dependent on the temperature that prevails at the point in time of the determination and on the measured pressure that is then present.

SUMMARY OF THE INVENTION

Before this backdrop, it is the objective of the present invention to at least partially remedy the problems associated with the state of the art. In particular, a method and a device are to be put forward which allow an improved determination of the amounts of gas present in a battery cell. The amount of gas should especially be determined non-destructively so that the amounts of gas can be determined by means of repeated non-destructive measurements spread out over a period of time and at different temperatures.

A method having the features of the independent patent claim contributes towards achieving these objectives. Advantageous refinements are the subject matter of the dependent patent claims. The features presented individually in the patent claims can be combined with each other in a technically meaningful manner and can be augmented by clarifying facts from the description and/or by details from the figures, whereby other embodiment variants of the invention are presented.

A method for determining the amount of a gas present in a battery cell is being proposed here, whereby the battery cell has an initial volume, and the method comprises at least the following steps:
a) the battery cell is immersed into a non-conductive liquid having a defined density at a first ambient pressure;
b) a lifting force is generated that acts in the opposite direction of a downforce of the battery cell;
c) the ambient pressure is changed to a second ambient pressure and the buoyancy force—which is dependent on the ambient pressure—of the battery cell in the liquid is measured;
d) the amount of gas present in the battery cell is measured, taking into account the second ambient pressure, the buoyancy force ascertained for the second ambient pressure, the temperature of the liquid and the density of the liquid.

The method entails a first step a) in which the battery cell to be examined is immersed into a non-conductive liquid. This is done in that the battery cell is completely submerged in the liquid. The liquid itself is non-conductive, that is to say, it cannot conduct any electric current, and it also has a known density that can be expressed, for example, in grams per cubic centimeter.

In this context, the first ambient pressure can be, for instance, the hydrostatic air pressure at the site of the Earth atmosphere where the measurement is being carried out. This pressure is generated (demonstrably) by the weight force of the air column standing on the surface of the Earth or on a body. For instance, conforming to standard, the mean air pressure of the atmosphere at sea level amounts to 101,325 [Pa]. The first ambient pressure, however, can also be the air pressure that actually prevails at the measuring site or else a standardized air pressure if the goal is to achieve very good comparability and reproducibility of several measurements that have all been carried out at the same air pressure. In this case, it can be, for example, the mean air pressure of the atmosphere, namely, 101,325 [Pa]. Especially for purposes of determining the amount of gas in completely filled battery cells which have already reached their maximum volume, it is advantageous to already select the first ambient pressure in such a way that it is higher than the pressure of the gas present in the battery cell.

In the next step b), a lifting force is generated that acts in the opposite direction of the downforce generated by the battery cell. The lifting force serves to hold the battery cells in a suspended state in the liquid.

In the subsequent step c), the ambient pressure that prevails in the liquid and in the medium surrounding the battery cells is raised to a second ambient pressure. During the raising of the ambient pressure to the second ambient pressure, the battery cell buoyancy force resulting from the lifting force and from the downforce is measured by means of a single measurement or else, as an alternative, continuously.

In the fourth step d) of the method, the amount of gas present in the battery cell is then determined, whereby the first and second ambient pressures, the buoyancy forces ascertained for these ambient pressures, the temperature of the non-conductive liquid and the density of the liquid are all used. Here, it is being assumed that the buoyancy force is calculated on the basis of the ideal gas law according to the following formula:

$$m_{buoyancy} = n \times R \times T \times 1/p \times \rho_{liquid} + (V_{battery\ cell} + V_{holding\ device}) \times \rho_{liquid}$$

In this context, the following parameters, among others, can be ascertained or employed:

m=force [N]; for example, $m_{buoyancy\ force}$; $m_{downforce}$; $m_{lifting\ force}$; $m_{measurement}$ n=amount of substance [mol] of the gas present in the battery cell R=universal gas constant; [8.3144 joule/Kelvin×mol]

T=temperature in Kelvin [K]

p=ambient pressure [Pa]

V=volume of the battery cells when in new condition; volume of the holding device $\rho_{liquid}$=specific density of the non-conductive liquid [gram/cm$^3$]

A holding device can be used to secure the battery cell in a defined and stable position during the immersion. When it comes to battery cells that are structured as so-called pouch cells, it can happen that their intrinsic weight causes them to become deformed during the immersion. In such a case, the holding device can provide remedy and ensure that the battery cells can be immersed without undergoing significant deformation. An exception to these deformations is those deformations brought about by a change in the volume of the gas present in the battery cell. Such deformations are still possible, even when holding devices are being used. In particular, deformations of the gas pockets are possible, insofar as such pockets have been provided on the battery cell and become filled with gas. During operation of the cell, the holding device also ensures dimensional stability and reproducible electric characteristic values. Otherwise, the formation of gas and the volume work of the active materials might cause loss of contact of the electrode sheets in the cell.

Acquiring and, if necessary, continuously monitoring the temperature of the non-conductive liquid can be done, for instance, by means of simple temperature sensors.

The buoyancy force that is still necessary to determine the amount of gas can be ascertained in step d) of the method according to the following formula:

$$m_{buoyancy\ force} = m_{downforce} - m_{lifting\ force} + m_{measurement}$$

The buoyancy force here consists of the weight force of the battery cell plus, if applicable, the weight force of the securing device that holds the battery cell in the liquid.

In this context, the lifting force is the force that is generated by a force-generating means that acts in the opposite direction of the downforce.

Moreover, the resulting measured force [$m_{measurement}$] is the measured force resulting from the downforce and the lifting force. This resulting force is the force that is exerted by the force-generating means after the counteracting downforce has been subtracted.

In this context, it is particularly advantageous if the force-generating means acts against a force-measuring means. In this case, the resulting force can be read directly out from the force-generating means as a measured value. In the case of an especially simple embodiment, the force-generating means can be in the form of a defined weight, a pretensioned spring, a hydraulic or pneumatic cylinder or something along these lines, which is suitable to exert a force. The force-measuring means can be, for example, a set of scales which detects the resultant force acting on it.

Once all of the necessary information is available after the above-mentioned steps have been carried out, the amount (n) of substance of the gas present in the battery cell can be calculated by means of the equation above after a transformation.

For this purpose, steps a) to d) can be carried out at least once in the sequence indicated here. It is possible for these steps to be carried out with a different frequency and/or overlapping at least sometimes.

Moreover, step c) can be carried out multiple times while the ambient pressure is being raised, so that a course-over-time of the buoyancy force as a function of the specific ambient pressure can be ascertained and recorded.

As an alternative to this method, the amount of gas present in the battery cell can also be determined in that the product that is obtained from $$m_{buoyancy} \times \frac{1}{R \times T} \times \frac{1}{\rho_{liquid}}$$

and that changes as the ambient pressure rises can be ascertained and recorded, so that a graph can be derived using, for example, a graphic method or a mathematical function. Towards this end, for example, the product can be plotted on the Y-axis and the reciprocal value of the ambient pressure can be plotted on the X-axis of a two-dimensional coordinate system. Here, the amount of substance of the gas present in the battery cell results directly from the slope of the graph within the value range in which a change in the ambient pressure leads to a change in the value of the product. In concrete terms, this means that the value of the product remains constant as long as the ambient pressure is equal to or smaller than an internal gas pressure inside the battery cell. In this context, the internal gas pressure is the pressure that prevails in the gas that is present inside the battery cell or inside the gas pockets. Once the ambient temperature rises above the internal gas pressure of the battery cell, the volume of the gas or of the gas pockets changes and the value of the product starts to decrease as the ambient pressure increases. This can be explained by the fact that the gas volume is compressed due to the rising external pressure, as a result of which the resultant buoyancy force becomes less.

In particular, it can be provided that, during the execution of the method, the non-conductive liquid and the battery cell are kept at a defined temperature during steps a) to d). Whereas the method can be carried out without problems at a wide range of temperatures such as, for instance, room temperature, during actual operation of the battery cells, it is often desirable to examine and determine with greater precision the properties relating to gas formation at higher temperatures. Particularly higher temperatures such as, for example, temperatures between 40° C. and 70° C., are of interest in this context. Such temperatures can occur, for example, during operation of battery cells in very hot environments or under summer operating conditions, or else during rapid-charging procedures. Here, it is especially important to know the behavior of the battery cells regarding the formation of gases more precisely in order to ensure a consistently safe and reliable operation of the battery cells.

In particular, the method can also provide that the pressure selected as the second ambient pressure is higher than the internal gas pressure in the battery cell. As a result, the amount of gas present in the battery cell can be determined even in battery cells which have already formed gases to a considerable extent and in which a very high internal gas pressure relative to the ambient pressure has already built up. Whereas in prior-art methods the amount of gas present in the battery cells could no longer be determined in this state, or else this could at least not be done non-destructively, the use of a second ambient pressure that is higher than the internal gas pressure that prevails in the battery cell makes it possible to non-destructively determine the amount of substance or amount of gas that is present, even in these cases.

In particular, a pressure can be selected as the second ambient pressure that is lower than the internal gas pressure in the battery cell. This method can be employed if the battery cell only has a very small filling volume in which the gas present in the battery cell is only at a very low pressure. In this case, the reduced second pressure can initially cause an increase in the amount of gas present in the battery cell, as a result of which the determination of the buoyancy force is rendered easier and more precise. If necessary, the second ambient pressure can be reduced to such an extent that, due to the increasing gas volume, the battery cell reaches its maximally possible volume expansion. By using the second ambient pressure, which is lower than the first ambient pressure, the contained amounts of gas enclosed there can be determined, even in battery cells in which the gas is only at a very low pressure and has not yet reached its maximally possible volume expansion.

In particular, it can be provided during the execution of the method for the lifting force to be selected in such a way that, together with the buoyancy force, it is equal to or greater than the downforce of the battery cell. This achieves that the battery cell immersed into the non-conductive liquid—and, if applicable, also the holding device associated with it—is/are completely submerged in the liquid and securely held there in a suspended state, without sinking to the bottom of the liquid container.

It is also especially advantageous if, in step d), the temperature-dependent solubility of the gas in a liquid present in the battery cell is additionally taken into account. It has been found that the solubility of the liquid present in the battery cell for dissolving the gas that is likewise present in the battery cell can drop considerably as the temperature rises. As a rule, the liquid is an electrolyte as well as, optionally, moisture that has formed or accumulated in the battery cell. If this is the case, a failure to consider the fact that the solubility drops markedly as the temperature rises would cause pronounced inaccuracies in the determination of the amount of gas that has been released. If the solubility of the liquid at the temperature actually present during the measurement is known and taken into account, the amount of substance can be determined with greatly improved accuracy.

In particular, the measurement of the parameters during steps a), b) and c) can be carried out in a sealed pressure chamber. The ambient pressure can be set in a highly and precisely controlled manner inside a sealed pressure chamber. This entails two advantages. On the one hand, it is easily possible to also implement higher second ambient pressures that are clearly higher than the internal gas pressure that prevails in the battery cell. As already mentioned above, this means that, for the first time, even battery cells with very high internal gas pressures can undergo an examination in order to determine the amount of gas present in them. In this context, it is even possible to initially lower the first ambient pressure before starting the measurements in order to initially increase the gas volumes which might be present and only be very small. During a subsequent increase in the ambient pressure, then even the volume changes in these very small gas volumes could be detected, the associated buoyancy value could be ascertained, and subsequently the amounts of substance of the gas could be determined. Finally, the measurement of the appertaining existing ambient pressure can then be measured with a very high degree of precision inside a defined pressure chamber, which then allows the calculation of the amount of gas to be highly accurate. Moreover, this translates into great reproducibility of the measurements.

In particular, at least a course-over-time curve of the ambient pressure, a temperature curve of the non-conductive liquid or a curve of the buoyancy force can all be continuously recorded in order to determine the amount of substance. Preferably, the above-mentioned curves are detected and stored simultaneously during the increase of the ambient pressure to the second ambient pressure so that they can then be evaluated in order to determine the amount of substance of the gas.

The method is especially well-suited to be carried out in conjunction with an aged battery cell whose gas pockets are bulging out and in which the internal gas pressure is greater than the hydrostatic air pressure, and especially greater than 1 bar.

Moreover, the present invention puts forward a device for determining the amount of a gas present in a battery cell, comprising at least a pressure chamber, a liquid container arranged in the pressure chamber, a pressure-measuring means for measuring an ambient pressure, a means for generating a lifting force, a measuring means for measuring a resulting buoyancy force as well as a control unit for detecting and processing the acquired measured values and for determining the amount of gas.

In this process, the ambient pressure is measured inside the pressure chamber and in the direct surroundings of the battery cell that is to be examined. The pressure-measuring means is suitable for measuring a first ambient pressure and also a plurality of additional higher second ambient pressures.

In this context, the control unit can be functionally connected to at least one measuring instrument, a sensor or other means which are suitable or configured to carry out the steps described here for the proposed method, especially according to steps a) to d) of the method claims.

Moreover, the device can have a heater that serves to heat up the non-conductive liquid present in the liquid container and it can also have a temperature-measuring means to measure the temperature of the liquid.

Furthermore, a computer program is being proposed comprising commands that cause the proposed device to carry out the process steps according to the independent method claim.

Finally, a computer-readable medium is being proposed on which the computer program is stored.

For the sake of clarity, it should be pointed out that the numerals used here ("first", "second", etc.) serve primarily (only) to differentiate among several similar objects, dimensions or processes, in other words, they especially do not necessarily indicate a dependence and/or sequence of these objects, dimensions or processes relative to each other. If such a dependence and/or sequence is/are necessary, this is explicitly mentioned here or else it is obvious to the person skilled in the art upon studying the concretely described embodiment.

BRIEF DESCRIPTION OF THE DRAWINGS

The invention as well as the technical field will be explained in greater detail below on the basis of the accompanying figures. It should be pointed out that the invention is not restricted to the embodiments presented. In particular, unless not explicitly presented otherwise, it is also possible for partial aspects of the facts elaborated upon in the figures to be extracted and combined with other components and insights stemming from the present description. In particular, it should be mentioned that the figures and especially the size ratios presented are only of a schematic nature. The following is shown.

DETAILED DESCRIPTION OF THE INVENTION

Figure 1:
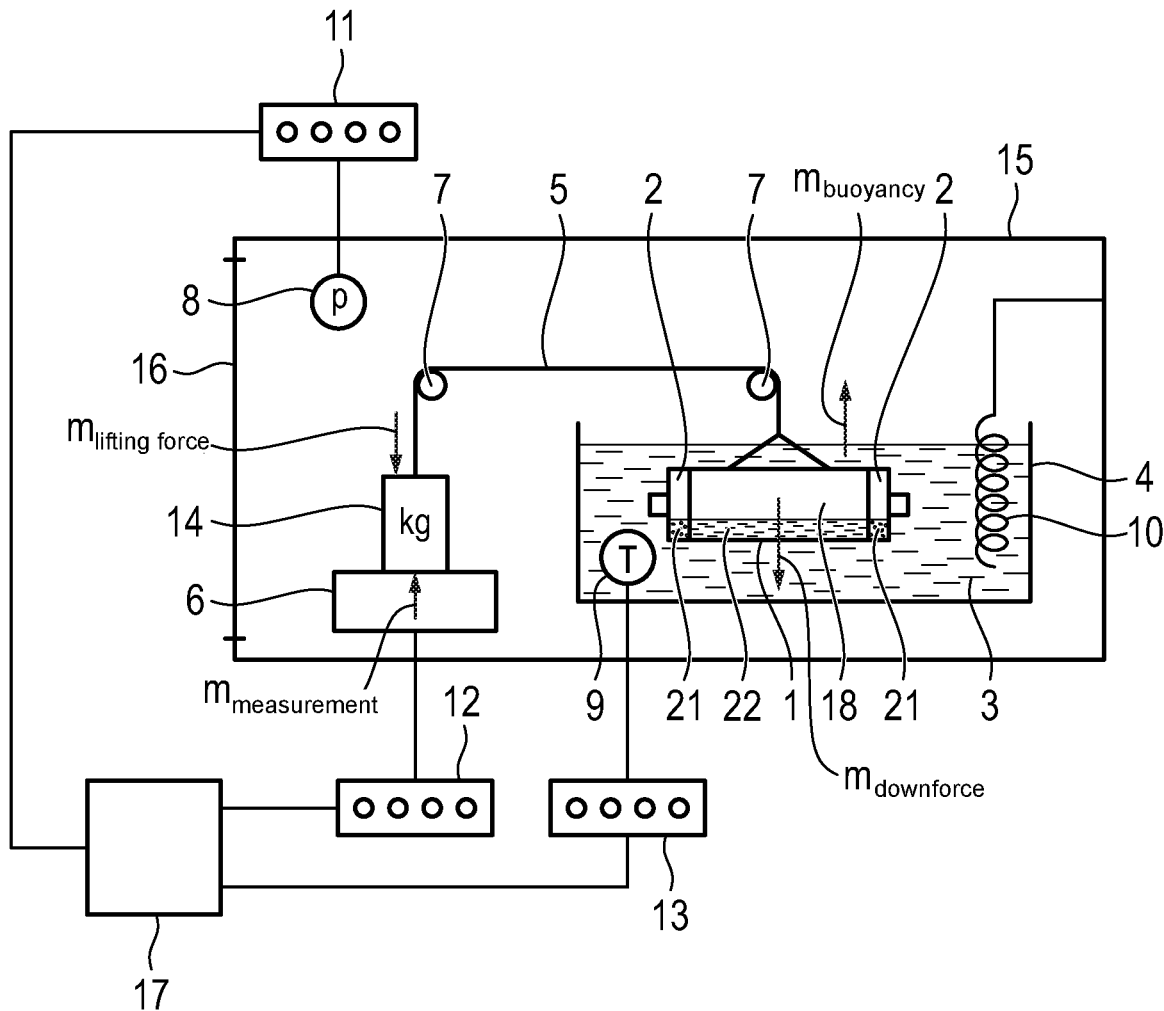
FIG. 1: a schematic depiction of a device for determining the amount of gas in a battery cell.

FIG. 1 shows a schematic side view of a conceivable embodiment of a device for carrying out the method according to the invention for determining the amount of a gas 21 in a battery cell 1. Two ends of the battery cell 1 have gas pockets 2 that are intended to hold a gas 21 that can be formed inside the battery cell 1 during ongoing operation. The battery cell 1 is completely submerged in a non-conductive liquid 3 that is held in a liquid container 4. The battery cell 1 is held below the surface of the non-conductive liquid 3 by a downforce [$m_{downforce}$] that acts downwards. The downforce counteracts a lifting force [$m_{lifting\ force}$] that is generated by a force-generating means 14. For this purpose, the generated lifting force is transmitted to the battery cell 1 by a cable 5 that is deflected by two rollers 7. In this context, the lifting force is dimensioned in such a way that it is greater than the downforce. As a result, the battery cell 1 is securely held in a suspended state inside the liquid container 4. The force [$m_{measurement}$] resulting from the lifting force and the downforce acts downwards in the vertical direction onto a force-measuring means 6. In this context, the force-measuring means 6 is configured, for instance, as a set of precision scales and it can detect the resultant force very precisely.

The above-mentioned components are arranged together in a pressure chamber 15. Moreover, a pressure-measuring means 8 and a temperature-measuring means 9 are arranged in the pressure chamber 15. If the temperature of the non-conductive liquid 3 drops below a prescribed temperature value, the non-conductive liquid 3 can be heated up by means of a heater 10 that is likewise arranged in the pressure chamber 15, so that the prescribed temperature can be maintained. The pressure chamber 15, in turn, has a door 16 that, in its closed state, is designed to completely seal off the pressure chamber 15 vis-à-vis the environment and that, in the open state, allows access to the components and devices located in it.

The pressure-measuring means 8 is connected to a display or recording means for pressure measurements 11. The force-measuring means 6, in turn, is connected to a display or recording means for force measurements 12, and the temperature-measuring means 9 is connected to a display or recording means for temperature measurements 13. All of the display or recording means 11, 12, 13 are connected to a control unit 17 that can retrieve and further process the stored measured data for the pressure, for the temperature and for the measured force. In order to prevent deformation of the battery cell 1 during the measurements, the battery cell is held in a holding device 18. In the present embodiment, the holding device 18 consists of two particle boards between which the battery cell 1 is arranged, whereby the particle boards are screwed to each other by means of several screws.

In the embodiment presented here, the downforce is thus calculated from the weight force of the battery cell 1 and the weight force of the holding device 18, including the particle boards and screws used. The buoyancy force that affects the battery cells 1 and the holding device 18 is determined from the volume of the two components and from the specific density of the non-conductive liquid 3.

Since, due to the gas formation that is to be examined, the volume of the battery cell 1 has changed as compared to the initial volume defined during production, the buoyancy force cannot be calculated but rather, it has to be ascertained by means of measurements. For this purpose, the force-measuring means 6 is used to measure the resultant force exerted on it by the force-generating means 14. In this particularly simple embodiment, the force-generating means 14 is configured in the form of a defined weight. On the basis of the values thus acquired, the buoyancy force m can be calculated by means of the following formula:

$$m_{buoyancy\ force} = (m_{battery\ cell} + m_{particle\ board} + m_{screw}) - m_{lifting\ force} + m_{measurement}$$

In this process, a first measurement of the buoyancy force is carried out at a first ambient pressure 19 that corresponds, for example, to the normal hydrostatic air pressure at the measuring site. Subsequently, the ambient pressure 19 in the pressure chamber 15 is raised incrementally and the appertaining buoyancy force for each selected increased ambient pressure 19 is then determined.

The formula below, in turn, describes the ratio of the buoyancy force to the amount of substance of the gas 21 present in the battery cell 1. With the buoyancy forces that have then been ascertained for the various ambient pressures, a transformation of the equation below allows the amount of substance of the contained gas 21 to be calculated.

$$m_{buoyancy} = n \times R \times T \times \frac{1}{p} \times \rho_{liquid} + (V_{cell} + V_{holding\ device}) \times \rho_{liquid}$$

This formula can also be transformed into $$m_{buoyancy} \cdot \frac{1}{RT} \frac{1}{\rho_{liquid}} = n\frac{1}{p} + C$$

wherein the following applies to the constant C:

$$C = \frac{(V_{cell} + V_{particle\ board})}{RT}$$

In this manner, a first buoyancy can be calculated for the first ambient pressure and a second buoyancy can be calculated for the second ambient pressure.

$$m_{buoyancy,1} \cdot \frac{1}{RT} \frac{1}{\rho_{liquid}} = n\frac{1}{p_1} + C$$

$$m_{buoyancy,2} \cdot \frac{1}{RT} \frac{1}{\rho_{liquid}} = n\frac{1}{p_2} + C$$

By now calculating the difference from the first and second buoyancies, the constant C can be eliminated, thus yielding the formula $$(m_{buoyancy,1} - m_{buoyancy,2}) \cdot \frac{1}{RT} \frac{1}{\rho_{liquid}} = n\left(\frac{1}{p_1} - \frac{1}{p_2}\right)$$

This formula can then be transformed as shown below in order to calculate the amount of substance n.

$$\frac{(m_{buoyancy,1} - m_{buoyancy,2}) \cdot \frac{1}{RT} \frac{1}{\rho_{liquid}}}{\left(\frac{1}{p_1} - \frac{1}{p_2}\right)} = n$$

Consequently, the amount of substance n can be determined, whereby, aside from the known values R, T and $\rho_{liquid}$, all that needs to be ascertained is the difference of the buoyancy forces and the difference of the first and second ambient pressures.

Figure 2:
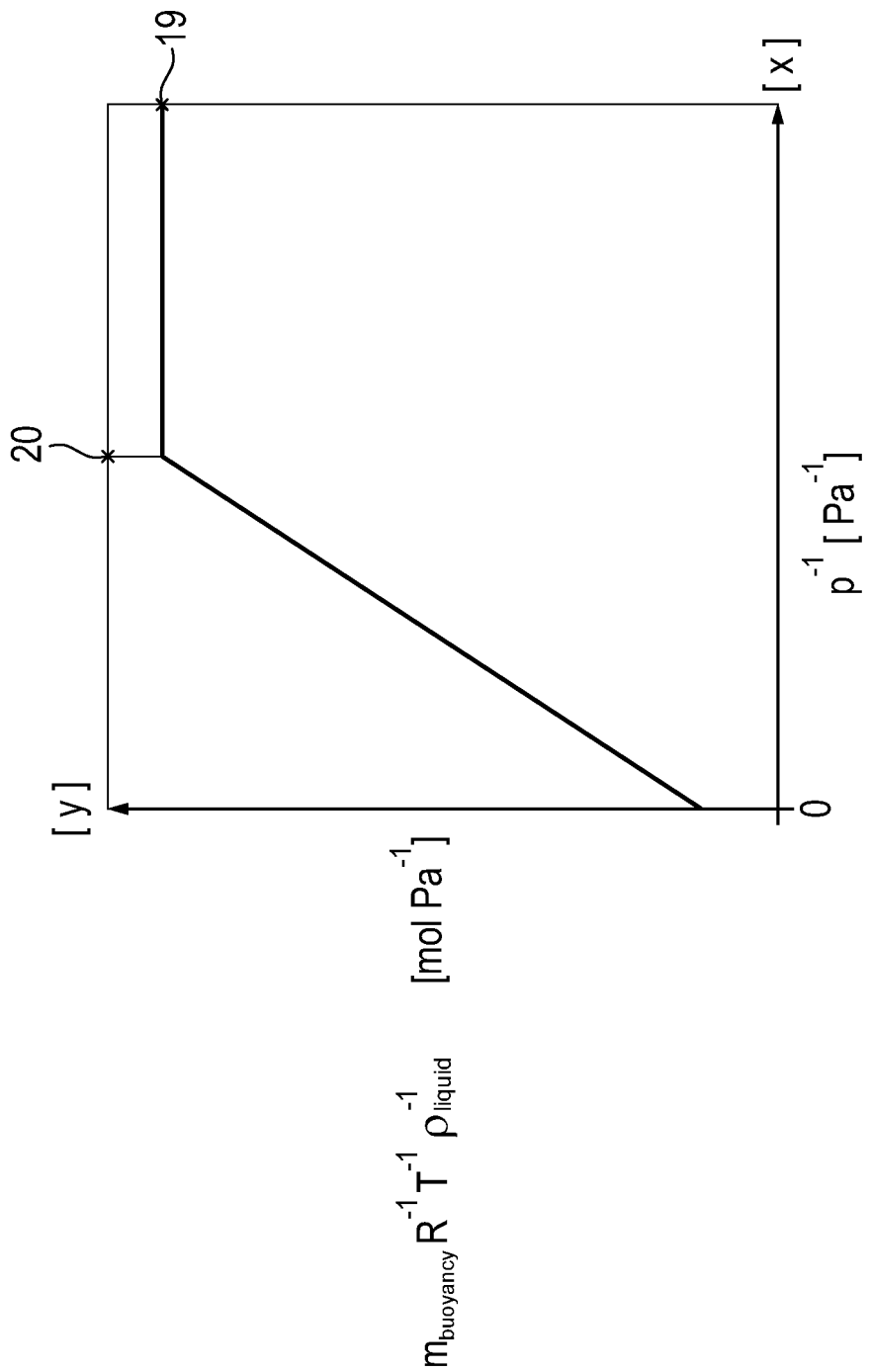
FIG. 2: a diagram for determining the amount of gas, drawn up within the framework of the method.

As shown in FIG. 2, the amount of substance can also be alternatively determined by means of a graph or a function.

For this purpose, the function $$m_{buoyancy} \times \frac{1}{R \times T} \times \frac{1}{\rho_{liquid}}$$

can be plotted in a coordinate system over the reciprocal ambient pressure. At the beginning of the measurement, a first ambient pressure 19 and an initial buoyancy force prevail. As the pressure increases, the graph initially drifts to the left until the ambient pressure 19 established inside the pressure chamber 15 is equal to the internal gas pressure 20 inside the battery cell 1. During the increase of the ambient pressure from the first ambient pressure 19 to the internal gas pressure 20, the buoyancy force initially remains constant. As soon as the ambient pressure has risen to a value that is greater than the internal gas pressure 20, the buoyancy force starts to drop.

The diagram thus acquired yields the amount of substance of the gas 21 present inside the battery 1 on the basis of the slope of the curve depicted in the left-hand portion of the graph. In this area of the graph, the ambient pressure is greater than the internal gas pressure 20 in the battery cell 1 or in the gas pockets 2.

Therefore, the method described here permits a non-destructive measurement of the amount of gas in the gas pockets 2 of the battery cell 1. The method can be utilized even for very aged battery cells whose gas pockets are already completely filled and bulging, and which also exhibit a markedly elevated internal gas pressure 20. Optionally, the temperature dependence of the solubility of the gas 21 in the liquid 22 that is present in the battery cell 1 can also be taken into consideration here. The liquid 22 can be, for instance, the employed electrolyte or else a mixture with other liquids that might be present there. For this purpose, for example, the non-conductive liquid 3 can be heated up to an elevated temperature since the solubility of the liquid 22 decreases at higher temperatures. In this context, it should be assumed that, when the amount of substance of the gas 21 that is present is determined at elevated temperatures, this fundamentally constitutes the more critical scenario. At higher temperatures, the solubility of the liquid 22 is considerably lower and a relatively large amount of gas 21 is present in gaseous form. This occurs, for example, in an application case in which a battery-powered electric vehicle is charged very rapidly. For this reason, the measurement of the gaseous amount of gas, for example, at a temperature of 60° C., is particularly important.

Towards this end, the temperature of the non-conductive liquid 3 can optionally be adjusted by means of the heater 10.

LIST OF REFERENCE NUMERALS

1 battery cell
2 gas pocket
3 non-conductive liquid
4 liquid container
5 cable
6 force-measuring means
7 deflection rollers
8 pressure-measuring means
9 temperature-measuring means
10 heater
11 display or recording means for pressure measurements
12 display or recording means for force measurements
13 display or recording means for temperature measurements
14 force-generating means
15 pressure chamber
16 door
17 control unit
18 holding device
19 first, second ambient pressures
20 internal gas pressure
21 gas
22 liquid in the battery cell

The invention claimed is:

1. A method for determining the amount of a gas present in a battery cell, whereby the battery cell has an initial volume, and the method comprises at least the following steps:

a) immersing the battery cell into a non-conductive liquid having a defined density at a first ambient pressure;

b) generating a lifting force that acts in the opposite direction of a downforce of the battery cell;

c) changing the first ambient pressure to a second ambient pressure, and measuring the buoyancy force—which is dependent on ambient pressure—of the battery cell in the liquid; and d) measuring an amount of gas present in the battery cell, taking into account the first and second ambient pressures, the buoyancy forces ascertained for these ambient pressures, the temperature of the non-conductive liquid and the density of the liquid, whereby any measurement of parameters during steps a), b) and c) is carried out in a sealed pressure chamber.

2. The method according to claim 1, whereby the non-conductive liquid and the battery cell are kept at a defined temperature during steps a) to d).

3. The method according to claim 1, whereby the pressure selected as the second ambient pressure is higher than an internal gas pressure in the battery cell.

4. The method according to claim 1, whereby the pressure selected as the second ambient pressure is lower than an internal gas pressure in the battery cell.

5. A method for determining the amount of a gas present in a battery cell, whereby the battery cell has an initial volume, and the method comprises at least the following steps:

a) immersing the battery cell into a non-conductive liquid having a defined density at a first ambient pressure;

b) generating a lifting force that acts in the opposite direction of a downforce of the battery cell;

c) changing the first ambient pressure to a second ambient pressure, and measuring the buoyancy force—which is dependent on ambient pressure—of the battery cell in the liquid; and d) measuring an amount of gas present in the battery cell, taking into account the first and second ambient pressures, the buoyancy forces ascertained for these ambient pressures, the temperature of the non-conductive liquid and the density of the liquid, whereby the lifting force is selected in such a way that, together with the buoyancy force, it is equal to or greater than the downforce of the battery cell.

6. The method according to claim 1, whereby, in step d), the temperature-dependent solubility of the gas in a liquid present in the battery cell is additionally taken into account.

7. The method according to claim 1, whereby at least a course-over-time curve of the ambient pressure, a temperature curve of the non-conductive liquid or a curve of the buoyancy force are all continuously recorded in order to determine the amount of substance.

8. The method according to claim 1, whereby the battery cell has an aged cell whose gas pockets are bulging out and in which an internal gas pressure is greater than the hydrostatic air pressure and is greater than 1 bar.

9. A device for determining the amount of a gas present in a battery cell, comprising:
   a pressure chamber,
   a liquid container arranged in the pressure chamber,
   a pressure-measuring means for measuring an ambient pressure,
   a force-generating means for generating a lifting force,
   a force-measuring means for measuring a resulting buoyancy force, and
   a control unit for detecting and processing the acquired measured values and for determining the amount of gas.

10. The device according to claim 9, further comprising:
    a heater that serves to heat up the non-conductive liquid present in the liquid container, and
    a temperature-measuring means to measure the temperature of the non-conductive liquid.

11. A non-transitory machine-readable storage medium comprising commands configured to cause a computer processor to carry out the method according to claim 1.

* * * * *